UNITED STATES PATENT OFFICE.

FRIEDRICH ELIAS, OF BERLIN, GERMANY.

PROCESS OF MAKING PEROXID OF MAGNESIUM.

SPECIFICATION forming part of Letters Patent No. 709,086, dated September 16, 1902.

Application filed February 24, 1902. Serial No. 95,366. (No specimens.)

*To all whom it may concern:*

Be it known that I, FRIEDRICH ELIAS, a subject of the Emperor of Germany, and a resident of Elsasserstrasse 42, Berlin, Germany, have invented certain new and useful Improvements in Processes of Producing Peroxid of Magnesium; and I do hereby declare the following to be a full, clear, and exact description of the invention, such as will enable others skilled in the art to which it appertains to make and use the same.

Up to the present time the manufacture of magnesium peroxid has depended on the employment of peroxid of hydrogen or peroxid of sodium as the raw material. It is impossible to manufacture magnesium peroxid cheaply from peroxid of hydrogen, as this latter material is too expensive. The manufacture from sodium peroxid as the raw material is not to be recommended, although by this method it can be produced more cheaply than by the first-mentioned process. In order to manufacture magnesium peroxid cheaply, it was necessary to find a cheaper raw material, and this is found in the peroxid of barium, which has a low market price. The soluble salts of magnesium are acted upon slowly by peroxid of barium, and a reaction takes place, resulting in the production of magnesium peroxid and a salt of barium corresponding to the magnesium salt which has been employed. If the action be allowed to continue a sufficient time the reaction will be complete, as shown by the following equation:

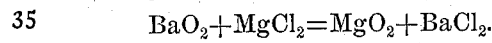
$$BaO_2 + MgCl_2 = MgO_2 + BaCl_2.$$

Such a process for the manufacture alluded to is believed to be novel. It must be insisted on as an essential condition that the barium peroxid employed must be converted into the hydrated form $(BaO_2 + 8H_2O)$ by trituration in contact with water for some time. The finely-divided particles of this material must now be separated from the coarser particles by levigation, bolting, or the like and then suspended in water. By the process just described not only is the barium peroxid thoroughly cleaned, but it is obtained in such a state that the succeeding chemical reaction is accelerated. Before acting upon the magnesium salt by the barium peroxid it is recommended to render the former slightly acid by the addition of a little dilute hydrochloric acid.

As an example illustrating the practical working of this invention the following particulars are given: One kilogram of magnesium chlorid is dissolved in four liters of water and the solution rendered slightly acid by the addition of dilute hydrochloric acid. Three-fourths of the equivalent quantity required for the reaction are taken of the finely-divided hydrated barium peroxid suspended in fifty-two parts of water, and this is then added to the solution of magnesium chlorid, the mixture being cooled by ice-water. The mixture must be left to react for about twelve hours, being well stirred every three hours. It is then filtered and washed and afterward dried cautiously at a temperature of about 100°.

Having thus described my invention, what I claim as new therein, and desire to secure by Letters Patent of the United States of America, is—

1. The process for producing peroxid of magnesium by acting upon barium peroxid by a slightly-acidulated solution of a magnesium salt, then filtering, washing and drying.

2. The process of producing peroxid of magnesium, which consists in hydrating peroxid of barium and reacting upon an acidulated solution of a magnesium salt with the resulting product, substantially as described.

3. The process of producing peroxid of magnesium, which consists in reacting upon a cold acidulated solution of a magnesium salt with hydrated peroxid of barium, substantially as described.

4. The process of producing peroxid of magnesium, which consists in reacting upon an acidulated solution of magnesium chlorid with barium peroxid, substantially as described.

5. The process of producing peroxid of magnesium, which consists in reacting upon an acidulated solution of magnesium chlorid with hydrated barium peroxid, substantially as described.

In testimony that I claim the foregoing as my invention I have signed my name in presence of subscribing witnesses.

FRIEDRICH ELIAS.

Witnesses:
HENRY HASPER,
WOLDEMAR HAUPT,
KARL FRANZKE.